United States Patent [19]

Kamerman et al.

[11] Patent Number: 4,860,308
[45] Date of Patent: Aug. 22, 1989

[54] MODEM COMMUNICATION SYSTEM HAVING MAIN AND SECONDARY CHANNELS

[75] Inventors: Adriaan Kamerman, Ta Nieuwegein; Johannes P. N. Haagh, Eindhoven, both of Netherlands

[73] Assignee: NCR Corporation, Dayton, Ohio

[21] Appl. No.: 175,375

[22] Filed: Mar. 30, 1988

[30] Foreign Application Priority Data

Sep. 10, 1987 [GB] United Kingdom ............. 8721260

[51] Int. Cl.⁴ .................................................. H04B 1/38
[52] U.S. Cl. ........................................ 375/8; 370/110.1; 332/10
[58] Field of Search .................. 375/7, 8, 38, 39, 81; 379/93, 63; 332/9 R, 9 T, 10; 370/69.1, 84, 110.1

[56] References Cited

U.S. PATENT DOCUMENTS

| | | | |
|---|---|---|---|
| 4,273,955 | 6/1981 | Armstrong | 178/696 |
| 4,301,417 | 11/1981 | Jansen et al. | 329/50 |
| 4,310,721 | 1/1982 | Manley et al. | 375/8 |
| 4,362,997 | 12/1982 | van Driest | 329/50 |
| 4,425,665 | 1/1984 | Stauffer | 375/9 |
| 4,521,891 | 6/1985 | Biba et al. | 375/8 |
| 4,528,519 | 7/1985 | van Driest | 330/279 |
| 4,530,104 | 7/1985 | Kamerman | 375/14 |
| 4,577,334 | 3/1986 | Boer et al. | 375/97 |
| 4,734,920 | 3/1988 | Betts | 375/38 |

FOREIGN PATENT DOCUMENTS

| | | |
|---|---|---|
| 0169548 | 7/1985 | European Pat. Off. |
| 0180066 | 7/1985 | European Pat. Off. |
| 0185332 | 12/1985 | European Pat. Off. |
| 0204308 | 6/1986 | European Pat. Off. |
| 2175480 | 5/1985 | United Kingdom |
| 2174274 | 10/1985 | United Kingdom |

OTHER PUBLICATIONS

U.S. patent application Ser. No. 163,357, assigned to NCR Corporation, filed Mar. 2, 1988, "Multipoint Data Modem Communication System", Jan Boer et al.

Bennett, W. R. and Davey, J. R.; Data Transmission; McGraw-Hill, New York, 1965; pp. 182–190.
Lucky, R. W., Salz, Jr. and Weldon, E. J.; Principles of Data Communication; McGraw-Hill, New York, 1968; pp. 226–232.
Bird, J. S.; Error Performance of Binary NCFSK in the Presence of Multiple Tone Interference and System Noise; IEEE Transactions on Communications, vol. COM-33, No. 3, Mar. 1985; pp. 203–209.
Sundberg, C. E.; Continuous Phase Modulation; IEEE Communications Magazine, vol. 24, No. 4, Apr. 1986; pp. 25–38.
Ansari, R. and Liu, B.; A Class of Low Noise Computationally Efficient Recursive Digital Filters; Proceedings IEEE International Symposium Circuits and Systems, Apr. 1981; pp. 550–553.
Ansari, R. and Liu, B.; A Class of Low Noise Computationally Efficient Recursive Digital Filters with Appli- (List continued on next page.)

Primary Examiner—Robert L. Griffin
Assistant Examiner—Stephen Chin
Attorney, Agent, or Firm—Wilbert Hawk, Jr.; Albert L. Sessler, Jr.; Richard W. Lavin

[57] ABSTRACT

A data modem communication system includes a data modem transmitter adapted to transmit data on a main channel at a relatively high bit rate and to transmit data at a relatively low bit rate on a secondary channel. At the receiver, a single analog-to-digital converter (54) supplies digital signals via a notch filter (58) to the main channel receiver (60) and to the secondary channel receiver (62) wherein a single IIR low-pass digital filter (110) is utilized for processing at three different sample rates to eliminate the main channel signal with frequency conversion taking place between processing at the first and second sample rates. The invention enables the provision of a reliable secondary channel while using a minimum amount of circuitry for complex-valued digital signal processing.

10 Claims, 8 Drawing Sheets

OTHER PUBLICATIONS cations to Sampling Rate Alterations; IEEE Transactions on Acoustics, Speech & Signal Processing, vol. ASSP-33, No. 1, 2/85.

Jennings, F.; Practical Data Communications-Modems, Networks, Protocols; Blackwell Scientific Publications, Oxford, 1986, p. 48.

CCITT-Data Communication Over the Telephone Network-vol. VIII-Fascicle VIII.1-Recommendations of the V-Series; Geneva, 1985, Recommendation V29; pp. 203-215.

Carey, M. B., Chen, H. T.; Descloux, A., Ingle, J. F. and Clark, K. I.; 1982/83, End Office Connection Study-AT&T Bell Laboratories Technical Journal, vol. 63, No. 9, Nov. 1984; pp. 2059-2119.

Motorola Inc., 2605 Series Data User Manual, Aug. 1984, Motorola Inc., Mansfield, Mass.

Racal Milgo's 14400 Bit/s System Modem Omnimode 14.4 Manual.

MODEM COMMUNICATION SYSTEM HAVING MAIN AND SECONDARY CHANNELS

BACKGROUND OF THE INVENTION

1. Field of the Invention.

This invention relates to communication systems and more particularly to modems used to transmit data over a transmission medium.

2. Description of the Prior Art.

Data modem communication systems are known which employ a relatively high data rate main channel and a relatively low data rate secondary channel, the two channels sharing a common transmission medium. For example, U.S. Pat. No. 4,273,955 discloses a data communication system which utilizes a 2400 bits per second main communication channel and a 110 bits per second auxiliary channel for telemetry information. At the receiver, high-pass and low-pass filters are used to separate the signals on the respective transmission channels.

The application of secondary channel transmission in data modem communication systems with main channel data transmission rates which are substantially higher than the aforementioned rate of 2400 bits per second, such as 14,400 bits per second, is more complex than with lower main channel data rate transmission such as 2400 bits per second, because of bandwidth limits on the transmission medium, which is normally a telephone line, and because of a higher sensitivity to disturbances at the higher data rate.

SUMMARY OF THE INVENTION

This invention relates to a data modem communication system, including a transmission medium having a main data channel whereon data is transmitted at a relatively high bit rate, a secondary data channel whereon data is transmitted at a relative low bit rate, modem transmitter means coupled to said transmission medium for transmitting data on said transmission medium, modem receiver means coupled to said transmission medium and including a main channel receiver and a secondary channel receiver, first filter means coupled to said main channel receiver and second filter means mounted in said secondary channel receiver, and an analog-to-digital converter coupled to said transmission medium and having an output connected to said first filter means which is adapted to suppress signals in said main channel receiver, said analog-to-digital converter further having an output coupled to said second filter means, wherein said second filter means includes a low-pass digital filter adapted to process signal samples at successively decreasing sample rates. The use of the analog-to-digital converter in both channels together with the use of the low-pass filter achieves high suppression of main channel signals while employing a minimum amount of circuitry when digital signal processing is utilized.

It is thus an object of the present invention to provide a data modem communication system having main and secondary channels, which is suitable for a high data transmission rate on the main channel, and which employs a minimum amount of circuitry using digital signal processing.

BRIEF DESCRIPTION OF THE DRAWING

Additional advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
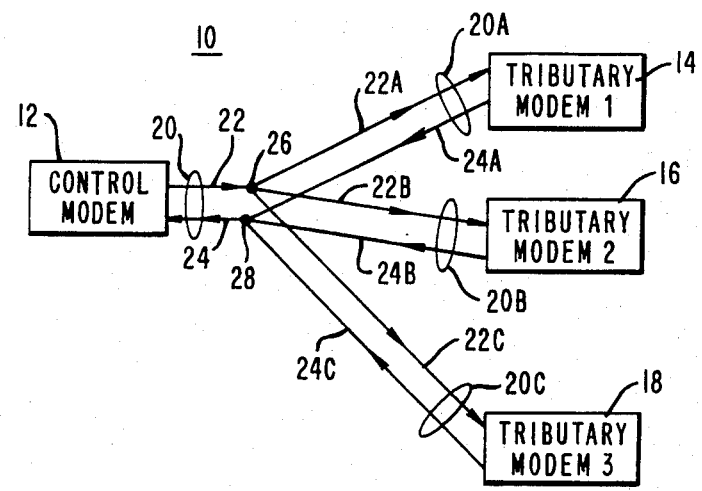
FIG. 1 is a block diagram showing a data modem communication system including main and secondary channels.

Referring now to FIG. 1, there is shown a multipoint modem network 10 wherein a control modem 12 is in communication with three tributary modems 14, 16 and 18. In practice, a larger or smaller number of tributary modems may be utilized. The control modem 12 is connected to a four-wire telephone line 20 including a two-wire transmit line 22 and a two-wire receive line 24. The four-wire telephone line 20 is connected to branch lines 20A, 20B and 20C which in turn are coupled to the respective tributary modems 14, 16 and 18. Thus, the two-wire transmit line 22 is connected via branch point 26 to the two-wire transmit lines 22A, 22B and 22C which are connected to the respective tributary modems 14, 16 and 18. The two-wire receive line 24 is connected via branch point 28 to the two-wire receive lines 24A, 24B and 24C which in turn are connected to receive signals from the respective tributary modem 14, 16 and 18.

Communication in the multipoint network 10 is effected via a main channel at a relatively high bit rate, such as 14,400 bits per second, and via a secondary channel at a relatively low bit rate, such as 75 bits per second. The main channel uses QAM (Quadrature Amplitude Modulation), although other types of modulation could be used for the main channel modulation. The secondary channel may carry status, diagnostic and network management information. Thus, the four-wire lines 20, 20A, 20B and 20C transmit and receive information over both main and secondary channels. In certain applications, however, the arrangement may be modified. Thus, in one alternative arrangement, the tributary modems 14, 16 and 18 may all receive information from the control modem over the main and secondary channels, but the tributary modem 14 may transmit only over the second channel while the tributary modem 16 may have no transmission capability and the tributary modem 18 may transmit over both the main and secondary channels.

Figure 2:
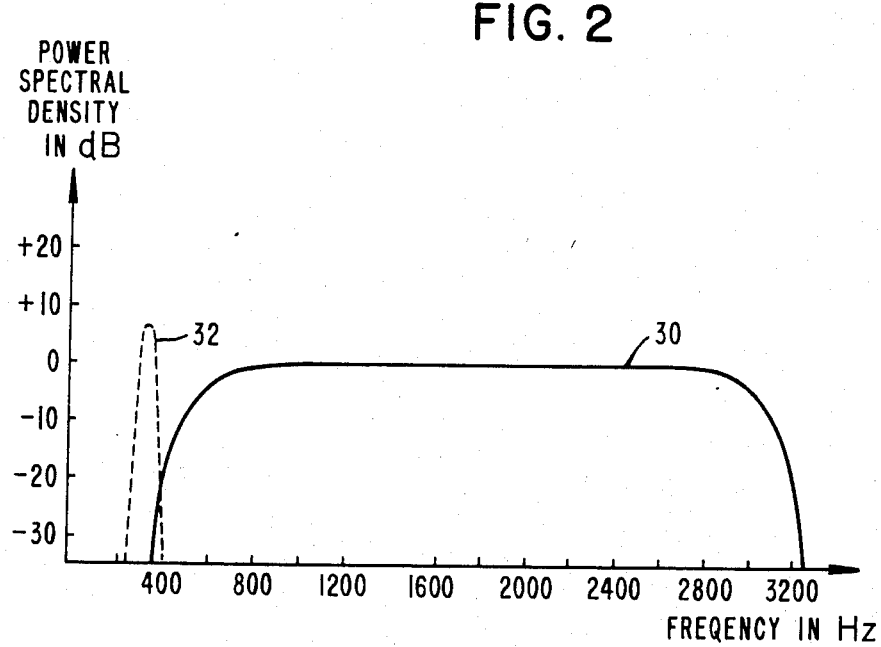
FIG. 2 is a graph showing plots of power spectral density for the main and secondary channels.

Referring now to FIG. 2, there is shown a graph of plots of power spectral density plotted against frequency in Hz. The general shape of the power spectral density for the main channel is shown as a solid line 30 and the general shape of the power spectral density for the secondary channel is shown as dashed line 32. The vertical scale for both plots is shown in dB, relative to 0 dBm (0 decibel milliwatts) for 2400 Hz. It will be seen from the plots 30, 32 that the main channel (600–3000 Hz band) has a relatively wide spectrum and the secondary channel (30–350 Hz band) has a relatively narrow spectrum.

Figure 3:
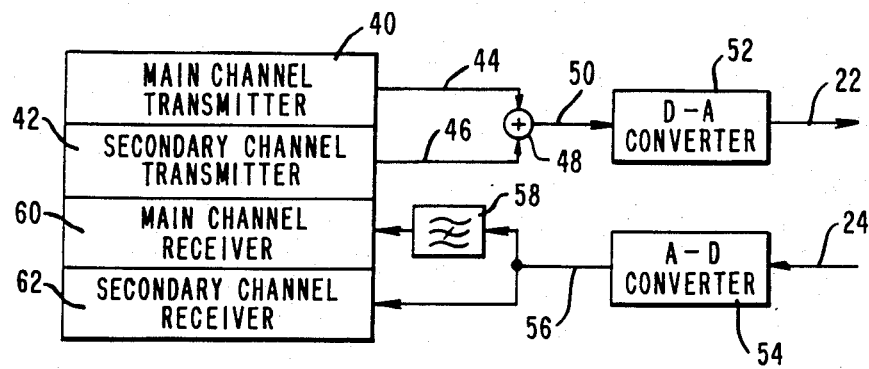
FIG. 3 is a block diagram showing the arrangement of the main and secondary channel transmitters and receivers in each of the modems.

Referring now to FIG. 3, there is shown a block diagram of the transmitters and receivers in the control modem 12, with the corresponding configuration for the tributary modems 14, 16, 18 being identical to that shown in FIG. 3. Referring first to the transmitter portion, the main channel transmitter 40 and the secondary channel transmitter 42 transmit signals on respective output lines 44, 46, which signals are added in an adder 48 whose output is connected over a line 50 to the input of a digital-to-analog converter 52 which has an output coupled to the transmit line 22.

The receive line 24 is connected to an analog-to-digital converter 54 whose output is connected over a line 56 to a digital notch filter 58, the output of which is coupled to the main channel receiver 60. The notch filter 58 is a band-stop digital filter which eliminates the secondary channel signal (300–350 Hz band) and passes the main channel signal (600–3000 Hz band) to the main channel receiver 60. Thus, the notch filter 58 acts as a high-pass filter, but a notch filter is used since the implementation is simpler than a high-pass filter. The construction of such notch filters is well known and will not be described herein.

The output line 56 of the analog-to-digital converter 54 is also connected to the secondary channel receiver 62 wherein filtering is effected to achieve a high suppression of the main channel signal, in a manner which will be described in detail hereinafter.

Figure 4:
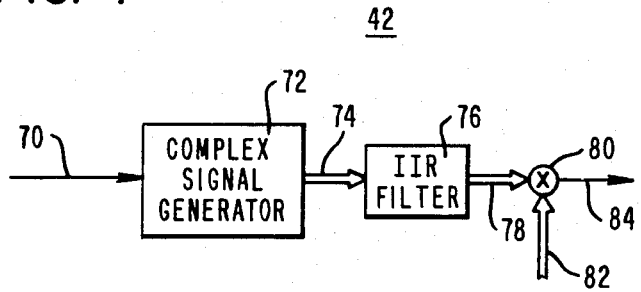
FIG. 4 is a block diagram for a secondary channel transmitter.

Referring now to FIG. 4, there is shown a block diagram of the secondary channel transmitter 42 (FIG. 3). A signal representing a mark or space symbol (e.g. high or low level signal) is applied on an input line 70 to a complex signal generator 72. The complex signal generator 72 is a binary continuous phase FSK modulator, that is, frequency shift keying with phase turns corresponding to two frequencies and with continuous phase changes between successive symbol intervals. The use of continuous phase FSK modulation results in less bandwidth being used, whereby the influence of noise and distortion is restricted. The complex signal generator 72 produces complex-valued samples at 9600 Hz on an output line 74. It should be understood that throughout the drawings, a double line interconnection is used for complex-valued quantities and a single line interconnection for real-valued quantities. Each complex-valued signal sample has, with regard to the previous sample, a phase turn of $-2\pi\ 20/9600$ or $+2\pi\ 30/9600$ radians, corresponding to a negative frequency of $-20$ Hz and a positive frequency of $+30$ Hz, respectively, according to whether the signal on the input line 70 represents a mark symbol or a space symbol. A mark symbol corresponds to 128 phase turns of $-2\pi\ 20/9600$ during the symbol interval and a space symbol corresponding to 128 phase turns of $+2\pi\ 30/9600$ during the symbol interval. After each symbol interval (1/75 sec, 128 samples), the same symbol and corresponding phase turns can occur or the other symbol and corresponding phase turns can occur.

Figure 5:
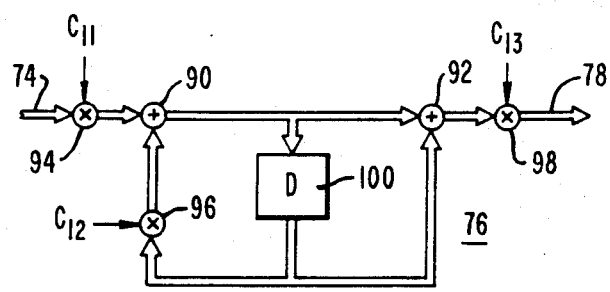
FIG. 5 is a diagram illustrating an IIR digital filter included in the secondary channel transmitter.

The complex output of the complex signal generator is applied over line 74 to an IIR (Infinite Impulse Response) digital low-pass filter 76, which removes signal components from the spectral side lobes, which could disturb the main channel signal. Referring briefly to FIG. 5, the IIR filter 76 includes adders 90, 92, multipliers 94, 96, 98 and a delay unit 100, connected in the manner shown in FIG. 5 by complex-valued signal lines. In a preferred embodiment, the coefficients have the values:

$C_{11} = 0.02395$
$C_{12} = 0.95209$
$C_{13} = 0.5$

These coefficients are determined by selecting initially an analog low-pass filter with minimal effect on the secondary channel in-band components ($-37.5$ Hz to $+37.5$ Hz) and high suppression of out-band components above 150 Hz. Then, in a well-known manner, the analog low-pass filter is converted to a digital low-pass filter.

Figure 6A:
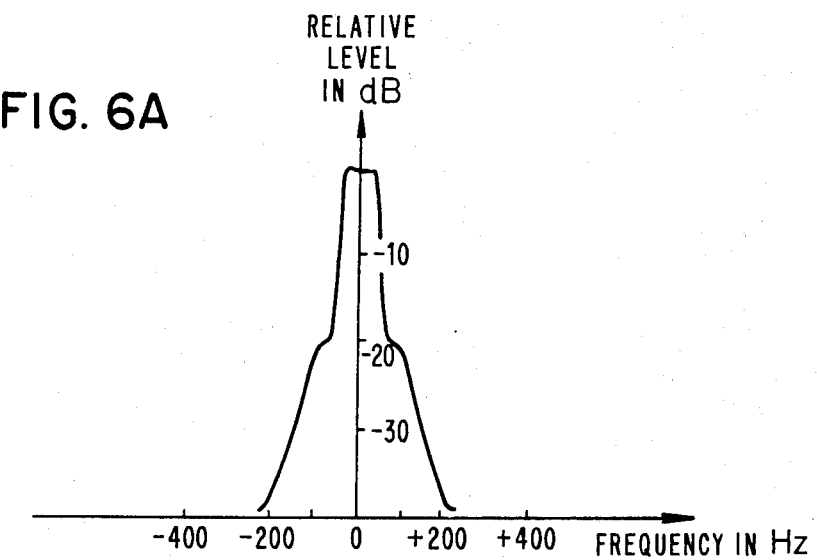
FIGS. 6A and 6B are graphs showing the signal spectrum at different locations in the secondary channel transmitter.
Figure 6B:
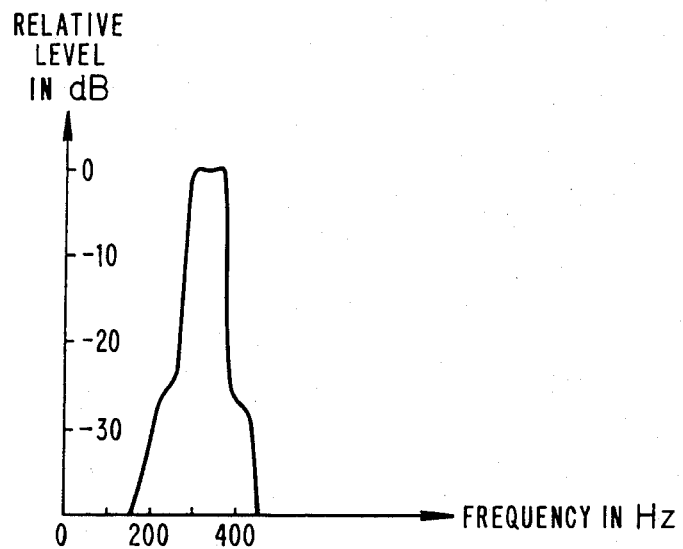

Returning to the description of FIG. 4, the complex-valued output of the IIR filter 76 is applied over line 78 to a frequency converter 80 having the form of a complex multiplier, which receives over a line 82 a signal $\exp(+j2\pi(320n/9600))$ which represents a complex-valued carrier signal of 320 Hz for successive samples at a 9600 Hz sample rate. The frequency converter multiplier 80 produces real-valued signal samples on an output line 84. It will be appreciated that the frequency converter 80 acts to effect a spectral shift of 320 Hz in the signal spectrum. Referring briefly to FIG. 6A, there is shown the signal spectrum of the signal at the input of the IIR filter 76. This signal spectrum is centered around 0 Hz. FIG. 6B shows the signal spectrum on the output line 84 of the frequency converter 80, after spectral shift and removal of the side lobes, and is a more precise representation of the dashed line 32 in FIG. 2 in showing the general shape of the secondary channel signal spectrum. The output line 84 is coupled to the line 46 (FIG. 3) whereby the real-valued signal samples of the secondary channel are added by the adder 48 to real-valued samples on the output line 44 of the main channel transmitter 40, for application to the digital-to-analog converter 52. It should be understood that the main channel transmitter 40 also operates at a 9600 Hz sample rate.

Figure 7:
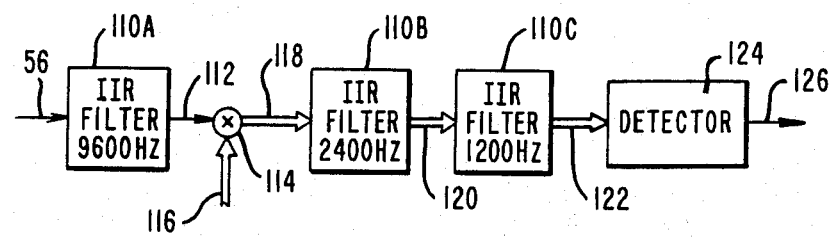
FIG. 7 is a block diagram illustrating the theory of the filtering operation in the secondary channel receiver.
Figure 9:
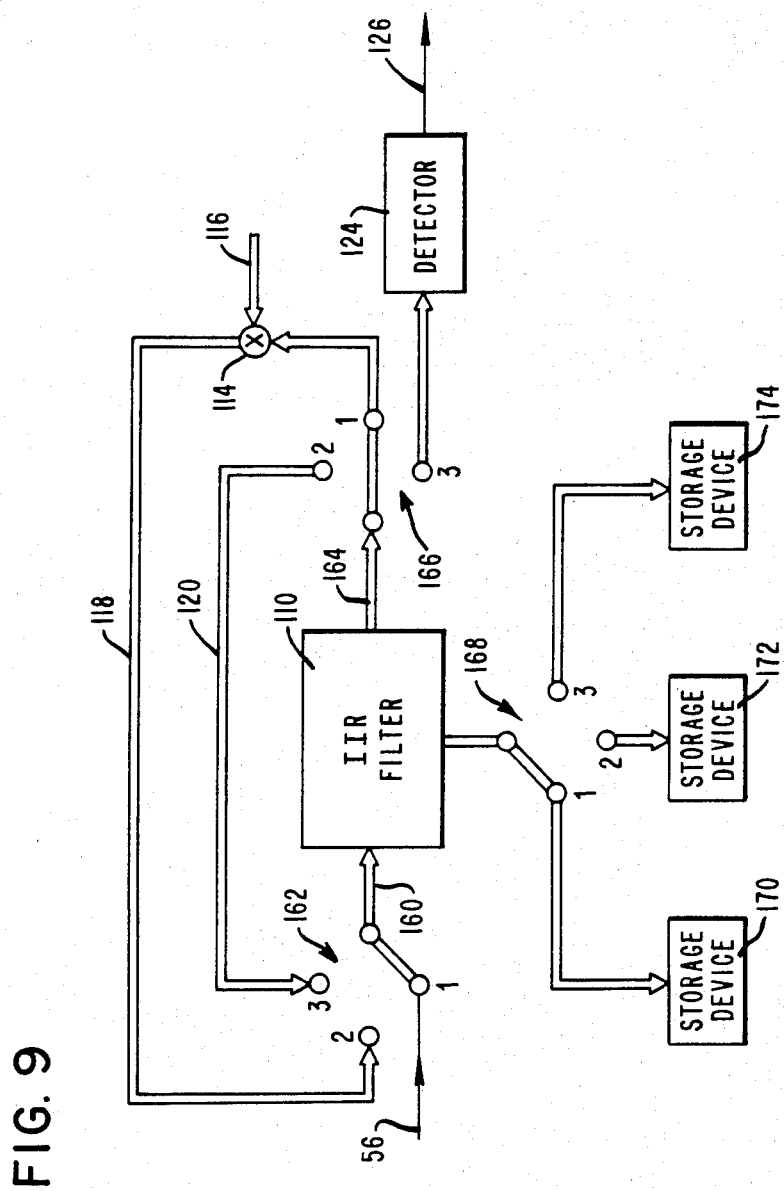
FIG. 9 is a diagram illustrating the use of a single IIR digital filter in the filtering operation in the secondary/-channel receiver.

The filtering operation in the secondary channel receiver 62 (FIG. 3) will now be described with particular reference to FIGS. 7 and 9. FIG. 7 illustrates the theoretical basis of the filtering operation, whereas FIG. 9 shows the practical implementation for such filtering operation. Referring first to FIG. 7, the signal on the line 56, from the analog-to-digital converter 54 (FIG. 3), is applied to a low-pass IIR digital filter 110A, wherein the signal is processed at the 9600 Hz sample rate, while frequencies above 800 Hz are eliminated. At the output of the filter 110A every fourth sample is selected to provide a real-valued signal having a sample rate of 2400 Hz which appears on an output line 112 of the filter 110A. This reduced sample rate signal on line 112 is applied to a frequency converter 114 appearing in the form of a multiplier, to which an input signal $\exp(-j\pi 2 \times (320.n.4./9600))$ is applied on a line 116. The resulting complex-valued output signal is applied over a line 118 to a low-pass IIR digital filter 110B, which is identical to the filter 110A, but is processed at a 2400 Hz rate. The filter 110B eliminates frequencies above 200 Hz, corresponding to main channel components above 520 Hz before the frequency conversion occurs in the frequency converter 114.

At the output of the filter 110B, every alternate (even) sample is selected to provide a sample rate of 1200 Hz on a line 120. The signal on the line 120 is applied to a low-pass IIR digital filter 110C, which is identical to the filters 110A and 110B, but is processed at a 1200 Hz rate. The filter 110C eliminates frequencies above 100 Hz, corresponding to main channel components above 420 Hz before the frequency conversion occurs in the frequency converter 114. At the output of the filter 110C, every alternate (even) sample is selected to provide a 600 Hz sample rate signal which is applied on a line 122 to a detector 124, which will be described in more detail hereinafter, and which provides an output signal representing the detected data bit on an output line 126. In connection with the foregoing description of the filters 110A, 110B, 110C, it will be appreciated that each of the filters eliminates frequencies greater than 0.08 times the sample rate at which the filter is processed. Thus, all frequency components above half of the new sample rate are eliminated, whereby degradation by aliasing (frequency fold over) is avoided. Furthermore, since the filters 110A, 110B, 110C are processed at sample rates of 9600 Hz, 2400 Hz and 1200 Hz respectively, the low-pass behavior of the filters has transition bands at 500-800 Hz, 125-200 Hz and 62-100 Hz respectively. For such filters, the behavior relative to the sample rate is the same. Thus, such filtering makes it possible to use a relatively simple filter with a low cut-off frequency and a small transition band.

Figure 8A:
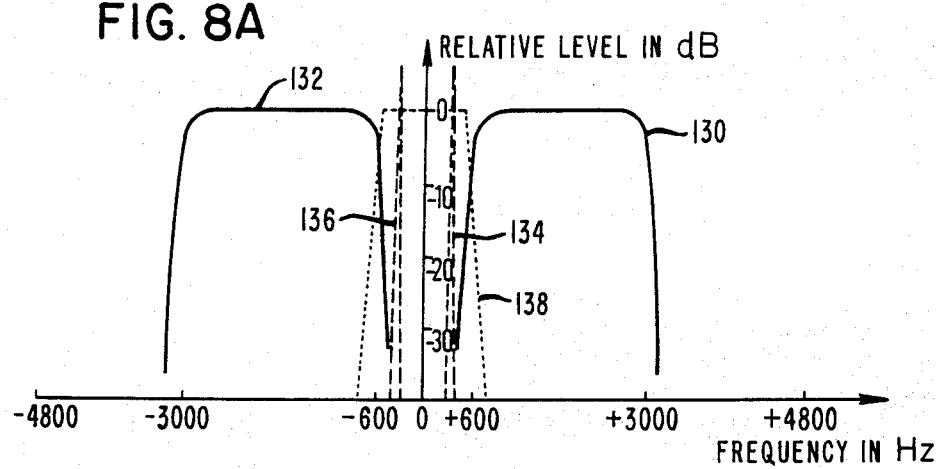
FIGS. 8A, 8B and 8C are graphs showing the signal spectrum at three locations in the secondary channel received.

An understanding of the secondary channel receiver filtering operation described above is assisted by reference to FIGS. 8A, 8B and 8C. FIG. 8A is a plot showing signal spectrum level against frequency at the input to the filter 110A. The solid line segments 130, 132 represent the main channel signal spectrum. The dashed line segments 134, 136 represent the secondary channel signal spectrum, and the dotted line segment 138 represents the filter characteristic.

Figure 8B:
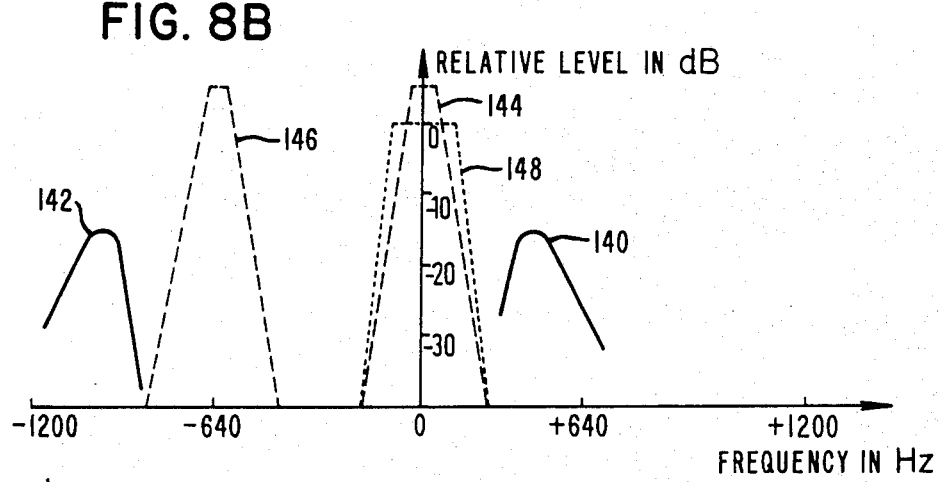

FIG. 8B is a plot showing signal spectrum level against frequency at the input to the filter 110B. The solid line segments 140, 142 represent the main channel signal spectrum, the dashed line segments 144, 146 represent the secondary channel signal spectrum and the dotted line 148 represents the filter characteristic.

Figure 8C:
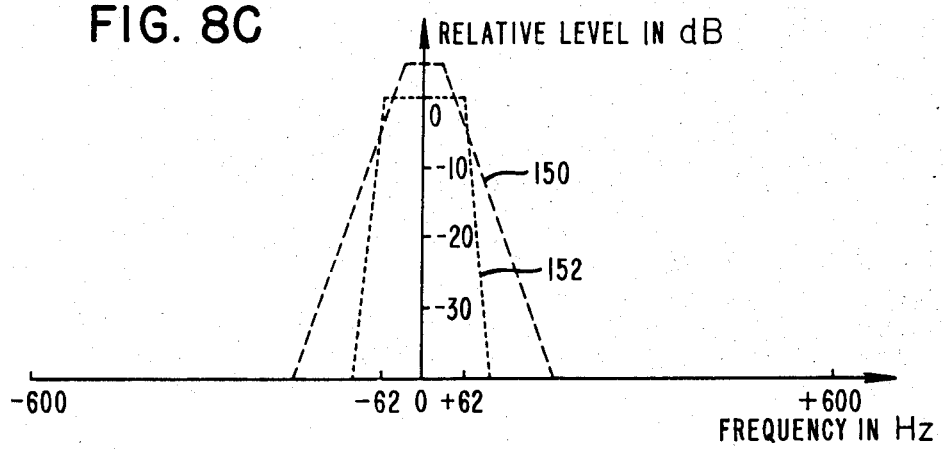

FIG. 8C is a plot showing signal spectrum level against frequency at the input to the filter 110C. The dashed line 150 represents the secondary channel signal spectrum and the dotted line 152 represents the filter characteristic.

The processing effected in the filters 110A, 110B and 110C during one symbol interval of 1/75 sec. is illustrated in the following Table A:

TABLE A

| Filter | Processing Effected | Output Samples Used |
|--------|--------------------|--------------------|
| 110A | 128 times at 9600 Hz | 32 |
| 110B | 32 times at 2400 Hz | 16 |
| 110C | 16 times at 1200 Hz | 8 |

The filters 110A, 110B and 110C have the same structure and the same coefficients. This enables a single filter to be utilized in the implementation of the filtering operation described with reference to FIG. 7. Such an implementation is shown in FIG. 9, which illustrates the manner in which a single IIR digital filter 110 is employed in the preferred embodiment of the invention to effect the processing described theoretically with reference to FIG. 7.

Referring now to FIG. 9, the IIR filter 110 which performs the functions of the filters 110A, 110B and 110C (FIG. 7), is shown connected between an input line 160 coupled to a three-position input switch 162 and an output line 164 coupled to a three-position output switch 166. Also provided is a third three-position switch 168 whose three terminals are connected to respective storage devices 170, 172 and 174. The storage devices 170, 172 and 174 are utilized to store internal samples from delay elements in the filter 110 corresponding to the time intervals during which the filter 110 is utilized for processing at the different processing rates, as described hereinafter. It should be understood that the switches 162, 166 and 168 are operated synchronously such that the corresponding terminals having positions labelled 1, 2 and 3 thereof are effective simultaneously.

It should be understood that the filters 110A, 110B and 110C shown in FIG. 7 correspond to the filter 110 (FIG. 9) with the switches 162, 166 and 168 in positions 1, 2 and 3 respectively. For a sample interval of 1/9600 second with the switches 162, 166 and 168 in position 1, the stored values of the delay elements are read out from the storage device 170 and supplied to the delay elements in the filter 110. The filter is then processed and the new contents of the delay elements are stored in the storage device 170. For each fourth sample interval with switch 166 in position one, the output of the filter 110 is used as the input to the frequency converter 114. With the switches in position 2, the input to the filter 110 is derived from position 2 of the input switch 162 and the contents of the storage device 172 are read into the delay elements in the filter 110. The filter is then processed and the contents of the delay elements are read out and stored in the storage device 172.

For the odd output samples of the filter 110 with the switches in position 2, there is a return to processing in switch position 1, but for each even output sample of the filter 110 the output sample of the filter with the switches in position 2 is used (once per 8 intervals of 1/9600 second) as the input of the filter 110 with the switches in position 3. Thus, with the switches in position 3 the contents of the storage device 174 are read into the delay elements in the filter 110, the filter is processed and the contents of the delay elements are stored in the storage device 174.

For the odd output samples of the filter 110 with the switches in position 3, there is a return to processing of the filter 110 with the switches in position 1, but for each even output sample of the filter in position 3 the output sample of the filter is used (once per 16 intervals of 1/9600 second) as the input to the detector 124.

Figure 10:
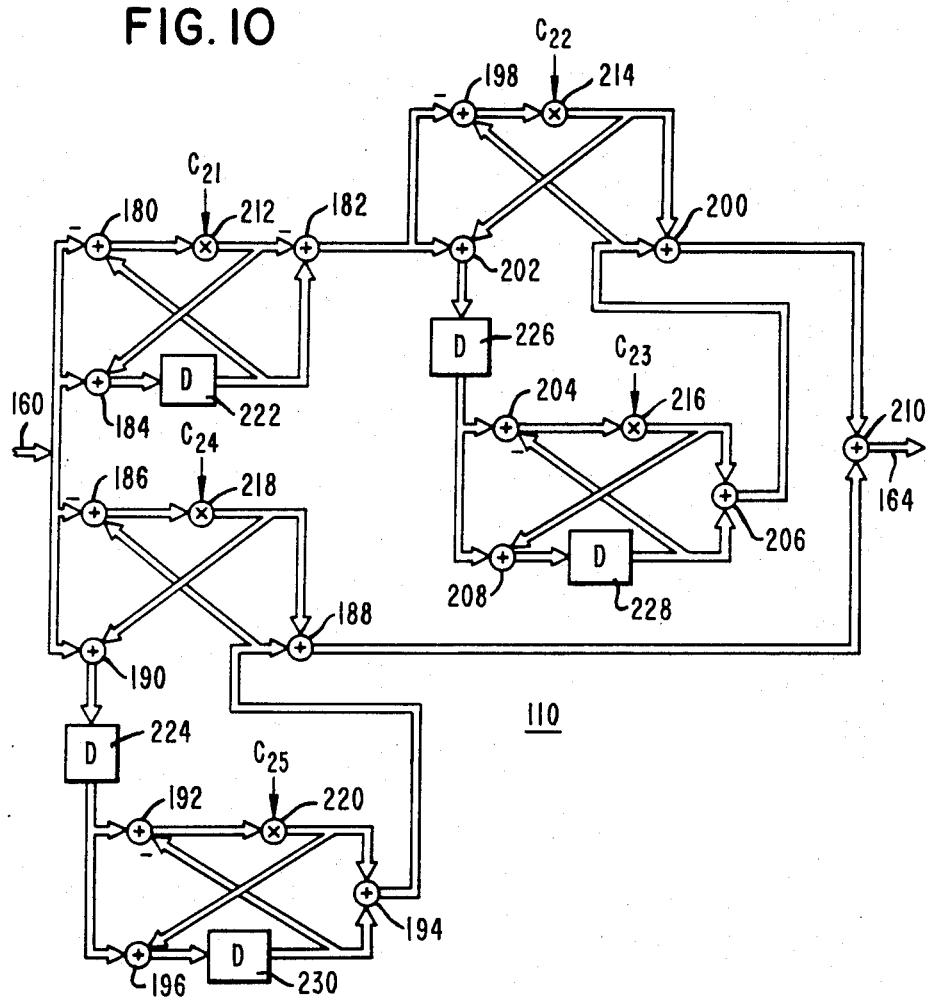
FIG. 10 is a diagram of the construction of the IIR digital filter shown in FIG. 9.

FIG. 10 shows an implementation for the IIR low-pass filter 110 shown in FIG. 9. The filter 110 is connected between the input line 160 and the output line 164 and includes adders 180-210 inclusive, multipliers 212, 214, 216, 218 and 220 utilizing coefficients $C_{21}$, $C_{22}$, $C_{23}$, $C_{24}$ and $C_{25}$ respectively, and delay elements 222-230 inclusive. The various components of the filter 110 are interconnected in the manner shown in FIG. 10. The IIR low-pass filter 110 is an elliptic type filter and the design of the filter 110 is preferably in accordance with the principles and filter structures discussed in an article by R. Ansari and B. Liu "A Class of Low Noise Computationally Efficient Recursive Digital Filters", Proceedings of the IEEE International Symposium on Circuits and Systems, April 1981, pages 550-553. The values of the coefficients utilized in the preferred embodiment of the invention are as follows:

$C_{21} = -0.79235$
$C_{22} = 0.91922$
$C_{23} = -0.94024$
$C_{24} = -0.74005$
$C_{25} = -0.95751$

These coefficients are derived by elliptic filter design techniques with the desired requirements for pass- and stop- band behavior, as discussed in the aforementioned article by Ansari and Liu, and in another article by the same authors, entitled "A Class of Low-Noise Computationally Efficient Recursive Digital Filters with Applications to Sampling Rate Alterations", IEEE Transactions on Acoustics, Speech and Signal Processing, vol ASSP-33, No. 1, February 1985, pages 90-97.

Figure 11A:
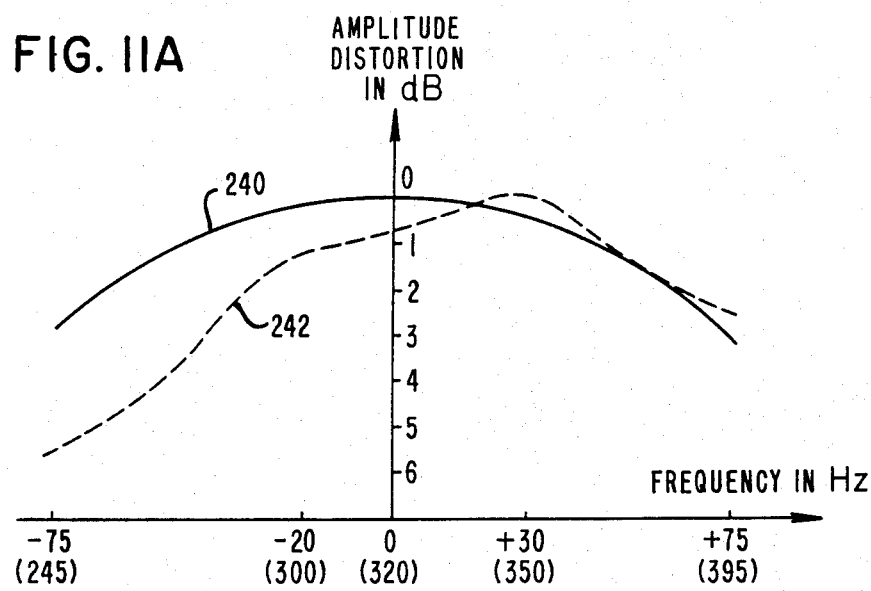
FIGS. 11A and 11B are graphs illustrating the amplitude distortion and delay distortion in the secondary channel.
Figure 11B:
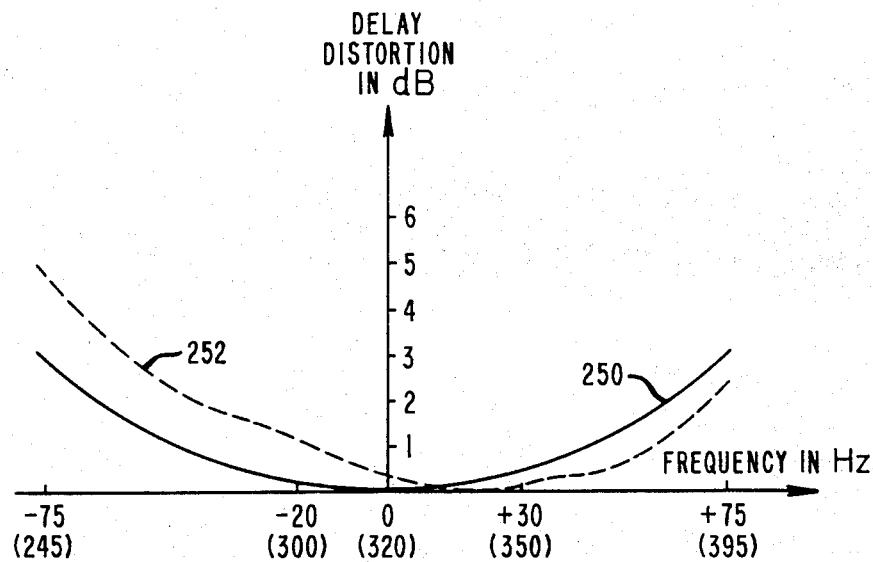

Referring now to FIGS. 11A and 11B there are shown plots which illustrate the transfer function (amplitude distortion in FIG. 11A and delay distortion in FIG. 11B) of the total secondary channel transmission path, including telephone line distortion. In FIG. 11A, (amplitude distortion), the solid line 240 represents no distortion and the dashed line 242 represents worst case distortion. In FIG. 11B, (delay distortion), the solid line 250 represents no distortion and the dashed line 252 represents worst case distortion. For different telephone lines, amplitude and delay distortion at 300 Hz relative to such distortion at 350 Hz will vary as follows:

| amplitude distortion: | 0 to 1.5 dB |
| delay distortion: | 0 to 1.3 msec. |

The total amplitude and delay characteristic of the filtering in the secondary channel transmitter and receiver is centered around 320 Hz. This gives differences in amplitude and delay characteristic at 300 Hz relative to those at 350 Hz as follows:

| amplitude characteristic: | −0.5 dB |
| delay characteristic: | −0.3 msec. |

Hence, the total, composed of contributions from transmitter filtering, telephone line distortion and receiver filtering for different telephone lines at 300 Hz relative to 350 Hz, will vary as follows

| amplitude distortion: | −0.5 to 1.0 dB |
| delay distortion: | −0.3 to 1.0 msec. |

Thus, it will be appreciated that the filtering provided in the preferred embodiment achieves precompensation for differences in distortion between 300 Hz and 350 Hz and hence enables a more reliable detection for telephone lines where a high level of distortion is introduced.

Figure 12:
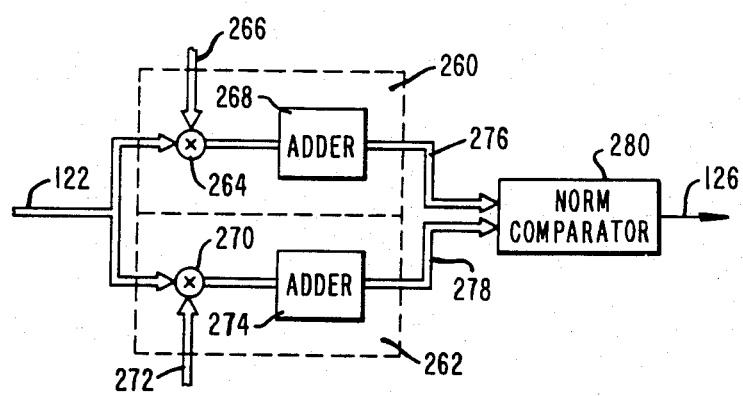
FIG. 12 is a diagram showing the detector used in the secondary channel receiver.

Referring now to FIG. 12, there is shown a block diagram of the detector 124 shown in FIGS. 7 and 9. The detector 124 has an input line 122 which is coupled to a $-20$ Hz correlator 260 and a $+30$ Hz correlator 262. The $-20$ Hz correlator 260 includes a multiplier 262. The $-20$ Hz correlator 260 includes a multiplier 264 which receives the input signal from the line 122, at a 600 Hz sample rate, and, over a line 266, the following multiplication factor $\exp(-j2\pi(-20.1.16)/9600)$,
L. where $1 = 0, 1, \ldots 7$.

The output of the multiplier 264 is connected to an adder 268 which effects successive additions for 8 successive samples, according to the formula:

$$\sum_{l=0}^{7} s_{K+1} \cdot \exp(-j2\pi(-20/600)l),$$

once per 1/75 second, with 8 input samples
$s_n = s_k, s_{k+1}, \ldots s_{k+7}$.

The $+30$ Hz correlator 262 includes a multiplier 270 which receives the input signal from the lines 122, at 600 Hz, and, over a line 272, the multiplication factor:

$\exp(-j.2\pi(30.1.16)/9600)$,
where $1 = 0, 1, \ldots 7$.

The output of the multiplier 270 is connected to an adder 274 which effects successive additions for 8 successive samples according to the formula $$\sum_{l=0}^{7} s_{K+1} \cdot \exp(-j2\pi(+30/600)l)$$

once per 1/75 second, with 8 input samples
$s_n = s_k, s_{k+1}, \ldots s_{k+7}$.

The complex-valued outputs 276 and 278 of the respective adders 268, 274 carry signals at a 75 Hz rate and are connected to a norm comparator 280. In the norm comparator 280 the squared vector lengths of the correlator outputs are calculated and compared. The norm comparator 280 then decides if during the last 1/75 second, a $-20$ Hz signal was more likely to occur than a $+30$ Hz signal as the input to the detector 124. Thus, with:

correlator 260 output $= x_1 + j\, y_1$ correlator 262 output $= x_2 + j\, y_2$ the squared vector lengths:

$v_1^2 = x_1^2 + y_1^2$ $v_2^2 = x_2^2 + y_2^2$ are calculated. If $v_1^2 > v_2^2$ then a $-20$ Hz signal corresponding to a mark symbol is detected. If $v_1^2 > v_2^2$ then a $+30$ Hz signal corresponding to a space symbol is detected.

The above description refers to the normal operation of the detector 124 during signal transmission. However, in order to provide an efficient initial detection when an initial pattern consisting of 14 mark symbol followed by 2 space symbols is transmitted, both correlators are initially tuned to −20 Hz, but with a half-symbol shift (1/150 sec) timing difference. Thus, in the correlator 260 the adder 268 effects the addition:

$$\sum_{l=0}^{7} s_{K+1} \cdot \exp(-j2\pi(-20/600)l)$$

and in the correlator 262, the adder 274 addition:

$$\sum_{l=0}^{7} s_{K+4+1} \cdot \exp(-j2\pi(-20/600)l)$$

When correlation to −20 Hz falls down, corresponding to a space symbol being present, the correlator 262 is changed to correlate at +30 Hz by changing the input signal on the line 272. Thus, an optimal first sample to start the normal operation of the detector 124 is derived, based on the aforementioned fall down of the correlation to −20 Hz. Hence, the two correlation measurements during subsequent normal operation of the detector 124 are made with appropriate timing.

Summarizing, it will be seen that the preferred embodiment of the invention includes a secondary channel receiver which is implemented by digital complex-valued signal processing and has the advantage of using a minimum amount of circuitry while achieving a high performance. Thus, only a single analog-to-digital converter is needed at the receiving modem, since the same signal samples are used for the secondary channel receiver as for the main channel receiver. Furthermore, accurate filtering and high suppression of main channel signal frequencies is achieved without aliasing (frequency fold over) by using a single filter which is processed a number of times at different sample rates. Moreover, the signalling and timing in the secondary channel are independent of the main channel and the secondary channel operates without interference from the channel and without causing degradation in the main channel during secondary channel transmission.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the claims.

We claim:

1. A data modem communication system comprising;
a transmission medium having a main data channel whereon data signals are transmitted at a relatively high bit rate and a secondary data channel whereon data signals are transmitted at a relatively low bit rate;
modem transmitter means coupled to said transmission medium for transmitting data signals on said transmission medium;
a remote modem receiver means coupled to said transmission medium and including a main channel receiver and a secondary channel receiver for receiving the same data signals transmitted over the transmission medium;
first filter means coupled to said main channel receiver and second filter means coupled to said secondary channel receiver for suppressing the main channel data signals by processing samples of the data signals a number of times; and
an analog-to-digital converter coupled to said transmission medium and having an output connected to said first filter means which is adapted to suppress the secondary channel data signals in said main channel receiver, said analog-to-digital converter further having an output coupled to said second filter means, wherein said second filter means includes a low-pass digital filter adapted to process samples of the data signals in said secondary channel receiver at successively decreasing sample rates.

2. A data modem communication system according to claim 1 in which said secondary channel receiver includes a frequency converter connected to the output of said low-pass digital filter whereby, after processing at a first one of said sample rates, said digital filter output is subject to a frequency conversion in said frequency converter to effect a negative frequency shift, prior to effecting processing at a second one of said sample rates.

3. A data modem communication system according to claim 1, wherein said modem transmitter means includes a secondary channel transmitter having a complex signal generator adapted to provide continuous phase FSK modulated signals, third filter means adapted to remove spectral side lobes from said continuous phase FSK modulated signals, and a frequency converter adapted to shift the signal spectrum of the output signals provided by said third filter means.

4. A data modem communication system according to claim 1, wherein said low-pass filter is an IIR low-pass digital filter having a plurality of sections for processing the data signal samples at different sample rates.

5. A data modem communication system according to claim 1, wherein said first filter means includes a digital notch filter for suppressing the low data signal samples appearing at the output of said analog-to-digital converter.

6. A data modem communication system according to claim 1, including detector means connected to an output of said second filter means, said detector means including first and second correlators adapted to determine the correlation with respect to first and second predetermined frequencies of the output of said low-pass digital filter.

7. A data modem communication system comprising;
a transmission medium having a main data channel whereon data is transmitted at a relatively high bit rate and a secondary data channel whereon data is transmitted at a relatively low bit rate;
modem transmitter means coupled to said transmission medium for transmitting data on said transmission medium;
modem receiver means coupled to said transmission medium and including a main channel receiver and a secondary channel receiver;
first filter means coupled to said main channel receiver and second filter means coupled to said secondary channel receiver;
an analog-to-digital converter coupled to said transmission medium and having an output connected to said first filter means which is adapted to suppress signals in said main channel receiver, said analog-to-digital converter further having an output coupled to said second filter means, wherein said second filter means includes a low-pass digital filter adapted to process signal samples at successively decreasing sample rates; and a frequency converter coupled to said secondary channel receiver connected to the output of said low-pass digital filter whereby, after processing at a first one of said sample rates, said digital filter output is subject to a frequency conversion in said frequency converter to effect a negative frequency shift, prior to effecting processing at a second one of said sample rates.

8. A data modem communication system according to claim 7 in which said secondary channel receiver includes a plurality of storage devices and said low-pass digital filter includes a plurality of delay elements wherein said second filter means includes a first multiposition switch coupled to an input of said low-pass digital filter, and a second multiposition switch coupled to the output of said low-pass digital filter, selected terminals of said second multiposition switch being coupled to selected terminals of said first multiposition switch, and said second filter means includes a third multiposition switch coupled to said plurality of storage devices adapted to store the contents of said delay elements.

9. A data modem communication system comprising;

a transmission medium having a main data channel whereon data is transmitted at a relatively high bit rate and a secondary data channel whereon data is transmitted at a relatively low bit rate;

modem transmitter means coupled to said transmission medium for transmitting data on said transmission medium;

modem receiver means coupled to said transmission medium and including a main channel receiver and a secondary channel receiver;

first filter means coupled to said main channel receiver and second filter means coupled to said secondary channel receiver;

an analog-to-digital converter coupled to said transmission medium and having an output connected to said first filter means which is adapted to suppress signals in said main channel receiver, said analog-to-digital converter further having an output coupled to said second filter means, wherein said second filter means includes a low-pass digital filter adapted to process signal samples at successively decreasing sample rates; and detector means connected to an output of said second filter means, said detector means including first and second correlators adapted to determined the correlation with respect to first and second predetermined frequencies of the output of said low-pass digital filter.

10. A data modem communication system according to claim 9, wherein said detector includes a norm comparator adapted to compare the squared vector lengths of the outputs of said correlators.

* * * * *

UNITED STATES PATENT AND TRADEMARK OFFICE
CERTIFICATE OF CORRECTION

PATENT NO. : 4,860,308
DATED : August 22, 1989
INVENTOR(S) : Adriaan Kamerman et al.

It is certified that error appears in the above-identified patent and that said Letters Patent is hereby corrected as shown below:

Column 12, line 21, delete the word "determined" and substitute --determine--.

Signed and Sealed this

Nineteenth Day of June, 1990

*Attest:*

HARRY F. MANBECK, JR.

*Attesting Officer*    *Commissioner of Patents and Trademarks*